(12) United States Patent
Whitehead et al.

(10) Patent No.: US 11,508,975 B2
(45) Date of Patent: Nov. 22, 2022

(54) MEANS FOR MAINTAINING DESIRED LIQUID LEVEL BETWEEN INTER-CONNECTED TANKS

(71) Applicant: REDT ENERGY (IRELAND) LIMITED, Dublinee (IE)

(72) Inventors: Adam Whitehead, Dublin (IE); Richard Underwood, Dublin (IE); Peter Ridley, Dublin (IE)

(73) Assignee: INVINITY ENERGY SYSTEMS (IRELAND) LIMITED, Dublin (IE)

( * ) Notice: Subject to any disclaimer, the term of this patent is extended or adjusted under 35 U.S.C. 154(b) by 136 days.

(21) Appl. No.: 16/977,261

(22) PCT Filed: Feb. 27, 2019

(86) PCT No.: PCT/IB2019/051580
§ 371 (c)(1),
(2) Date: Sep. 1, 2020

(87) PCT Pub. No.: WO2019/166970
PCT Pub. Date: Sep. 6, 2019

(65) Prior Publication Data
US 2021/0043953 A1    Feb. 11, 2021

(30) Foreign Application Priority Data
Mar. 1, 2018    (GB) ...................... 1803359

(51) Int. Cl.
*H01M 8/04082*    (2016.01)
*H01M 8/04186*    (2016.01)
*H01M 8/18*    (2006.01)

(52) U.S. Cl.
CPC ... *H01M 8/04201* (2013.01); *H01M 8/04186* (2013.01); *H01M 8/188* (2013.01)

(58) Field of Classification Search
None
See application file for complete search history.

(56) References Cited

FOREIGN PATENT DOCUMENTS

| CN | 106229536 A | * 12/2016 |
| JP | H02195657 A | 8/1990 |
| JP | 2003303611 A | 10/2003 |
| WO | 2016007555 A1 | 1/2016 |

OTHER PUBLICATIONS

CN-106229536-A—Machine Translation (Year: 2016).*
Int'l. Search Report for PCT/IB2019/051580, dated May 27, 2019.

* cited by examiner

*Primary Examiner* — Haroon S. Sheikh
(74) *Attorney, Agent, or Firm* — Blue Filament Law PLLC

(57) ABSTRACT

Means for maintaining level complementary electrolytes inflow battery tanks has first and second interconnected tanks 2, 3. The first tank 2 contains positive electrolyte, 2b, and the second tank containing negative electrolyte 3b. Both tanks have a void 2a and 3 a respectively, for air or other noble gases. The tanks themselves are connected by pipes; a lower tank connecting pipe 4, an upper tank connection pipe 5 with an inter-pipe connecting pipe 6 therebetween. The peak of the lower tank connection pipe 4a is designed to remain below the normal liquid level 7 of both tanks, in contrast to the upper tank connection pipe 5 which remains above the desired liquid level 7.

20 Claims, 2 Drawing Sheets

MEANS FOR MAINTAINING DESIRED LIQUID LEVEL BETWEEN INTER-CONNECTED TANKS

FIELD OF THE INVENTION

The present invention relates to a means for maintaining a desired liquid level between a pair of tanks, particularly, but not limited to, the electrolyte level in electrolyte tanks used in vanadium redox flow batteries.

BACKGROUND OF THE INVENTION

A vanadium redox battery generally comprises a pair of tanks, one filled with a positive electrolyte, the other with a negative electrolyte. Between the tanks is a cell stack to which the electrolyte from each tank is pumped. A partially-permeable membrane separates the two electrolytes in the cell stack. In passing charge through the cells, most of the current is in the form of a net transfer of hydrogen ions across the membrane. Water, vanadium ions, sulphate and bi-sulphate ions may also cross the membrane. This net diffusion results in the electrolyte levels of one tank increasing and the other decreasing.

The problem is known, and there are existing methods intended to address the issue. For example, it is common practice to pump the excess electrolyte from the relatively full tank to the other, relatively empty tank. This is an active means to address the issue, there are other, more passive means known, including the following:

1. Utilising a communicating pipe between the electrolyte tanks with a valve placed therebetween. The valve is opened periodically under control of a battery management system.
2. The use of an overflow pipe connecting the electrolyte tanks—although this necessarily requires a difference between the fluid levels in the tanks to operate (and is understood to operate with an imbalance in electrolyte volume within a given range). This has also been disclosed as a vanadium redox flow battery with "an anti-syphoning balance pipe incorporated in the tanks to allow any solution passing the fill limit of one tank to flow back into its place of origin in the adjacent tank."
3. The use of a singular open pipe which maintains fluid communication between the electrolytes in the positive and negative tanks, such a pipe maintains essentially the same level of fluids in both tanks, is simple and inexpensive.

The first method in the above list is not truly passive as it requires sensors to determine appropriate times to open the valves.

The second generally necessitate a loss of capacity as there is inherently an imbalance in fluid levels. This arises because of the uncertainties in the amount of electrolyte pumped into the tanks, and the amount initially displaced by air in the cell stacks.

The third method is preferable amongst the above discussed methods as it is truly passive and maintains fluid capacity almost exactly. However, there are two major drawbacks:

If one of the tanks ruptures, electrolyte will be syphoned from the other tank, through the connecting pipe until the liquid level is below the connecting pipe—thereby increasing the volume to be spilt as well as the heat resultant from mixing of the electrolytes, and The pipe is liable to suffer from airlocks, especially when initially filling and during operation as dissolved gases are released.

BRIEF SUMMARY OF THE INVENTION

The object of the present invention is to provide improved means for maintain a desired liquid level in between inter-connected tanks.

According to the invention there is means for maintaining level complementary electrolytes in a pair of flow battery tanks, the means comprising:
a first tank, and
a second tank, wherein the first and second tanks are connected by:
  a lower tank connection pipe, and
  an upper tank connection pipe, wherein:
    the lower tank connection pipe and the upper tank connection pipe are connected by an inter-pipe connecting pipe.

In the preferred embodiment, one of the tanks will house positive electrolyte, and the other electrolyte tank will house negative electrolyte. The preferred embodiment of the present invention is intended for use in a vanadium redox flow battery, wherein a cell stack would be located between the two electrolyte tanks, with the electrolyte from each tank being pumped to the cell stack. It is envisaged that the above arrangement may be utilised in any scenario wherein there is a desired fill level to be maintained between two tanks which are connected to each other.

In the preferred embodiment the lower tank connection pipe is connected to both the first and second tanks below the normal/desired fluid level of each tank, thereby providing continuous communication between them. It is envisaged that the inlet/outlet of the lower tank/connection pipe could extend into the body of the tank.

Normally, the lower tank connection pipe is curved such that it has a high point between the first and second tanks. It is envisaged that the curve could be gentle, or more pronounced. In one variant, the lower tank connection pipe could be substantially "W" shapes, the saddle of the "W" may even extend further upwards to ensure a high point relative to the pipe openings. Alternatively, the lower tank connection pipe could be straight.

In an embodiment of the present invention, the lower tank connection pipe is a thin tube. The lower tank connection pipe being adapted such that it minimises the volume of electrolyte which is relatively stagnant as a result of being in the lower tank connecting pipe.

In another embodiment of the present invention, the lower tank connection pipe is adapted to be of sufficient volume so that it may accommodate substantially the entire volume of electrolyte moving between the tanks in one charge or discharge half-cycle. The lower tank connection pipe may have a constant bore size, alternatively, the bore may vary.

In the preferred embodiment, the lower tank connecting pipe is adapted to prevent rapid mixing of electrolyte, such as by having a high length:diameter ratio.

Normally, the upper tank connection pipe is connected to both the first and second tanks above the normal liquid levels. Whilst the upper and lower pipes may be of the same diameter, it is preferred to have a larger diameter in the upper tank connection pipe. It is envisaged that the bore could be in the range of 10 mm-80 mm, preferably 25 mm. However, the bore required for a redox battery is dependent upon the capacity of the redox battery it is to be used with.

In the preferred embodiment, the relatively large diameter of the upper tank connection pipe is an adaptation allowing it to act as an overflow pipe in the event that the lower tank connecting pipe become blocked, by a precipitate, for example.

The inter-pipe connecting pipe is normally connected to both the lower and upper tank connection pipes. This is preferably done by having the inter-pipe connecting pipe attach to the lower pipe at the highest part of the lower pipe.

Preferably, the lower pipe, upper pipe and inter-pipe connecting pipe are in substantially the same plane, i.e. substantially perpendicular to the ground. Alternatively, the pipes may be out of alignment relative to each other, as long as the inter-pipe connecting pipe is generally orientated so that there is an incline between the lower and upper pipes.

In the preferred embodiment, the upper tank connection pipe is substantially flat, although it may be curved. As well as an overflow pipe, when the invention is used as part of a vanadium redox flow battery, for example, the upper tank connection pipe allows for movement of an argon or nitrogen blanket between the two tanks, preserving efficiency of the arrangement.

The arrangement presently disclosed means that the process of filling the tanks no longer needs to be accurately controlled. This means that different fill levels in the tanks could be accommodated by a single system, set up in accordance with the present invention.

In the preferred embodiment, the present invention is intended for use with vanadium redox flow batteries. It is envisaged that any process involving a plurality of tanks wherein mass transfer between the tanks is an issue could utilise the invention as disclosed herein. Normally, the liquid is an electrolyte. However, it is envisaged that any liquid could be used.

Reference is made to a normal electrolyte level. The normal level is used interchangeably with the desired fill level. The same equipment set up function with a range of normal electrolyte levels, as long as other conditions are satisfied.

BRIEF DESCRIPTION OF DRAWINGS

To help understanding of the invention, a specific embodiment thereof will now be described by way of example and with reference to the accompanying drawings, in which.

DETAILED DESCRIPTION OF THE INVENTION

Figure 1:
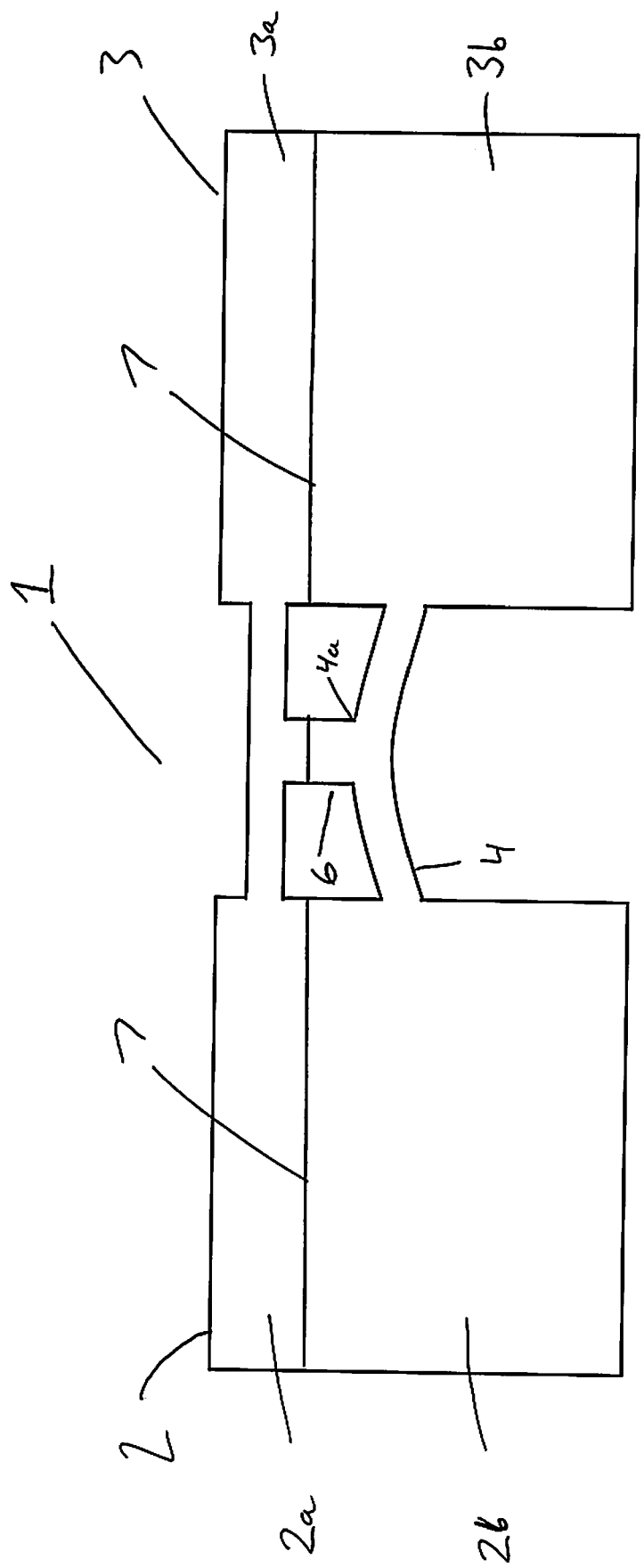
FIG. 1 shows a cross-sectional representation of a vanadium redox flow battery in accordance with the present invention and FIG. 2 shows the arrangement of FIG. 1, wherein one of the tanks has been punctured.

Referring to FIG. 1, a cross sectional view of a pair of electrolyte tanks can be seen fitted with a device in accordance with the preferred embodiment of the present invention 1. There is a positive electrolyte tank 2, and a negative electrolyte tank 3. Each respective tank has a portion filled with electrolyte, 2b, 3b and a portion is an air void 2a, 3a. The air void may be filled with argon, or other noble gas to form a blanket.

Connected to both the positive electrolyte tank 2 and negative electrolyte tank 3 is a lower tank connection pipe 4. The lower tank connection pipe 4 is of high length: diameter ratio. Additionally, the lower tank connection pipe 4 is designed such that it has a high point 4a. The entirety of the lower tank connection pipe 4 and its peak 4a are designed to lie below the normal liquid level 7 of both tanks.

In addition to the lower tank connection pipe 4 is an upper tank connection pipe 5. The upper tank connection pipe 5 may have a larger diameter than the lower tank connection pipe 4. As can be seen in FIG. 1, the upper tank connection pipe 5 connects to the positive electrolyte tank 2 and negative electrolyte tank 3 above the normal electrolyte level 7. The upper tank connection pipe 5 is capable of acting as an overflow pipe, in the event that the lower tank connection pipe 4 is blocked.

In addition to the lower tank connection pipe 4 and upper tank connection pipe 5 there is an inter-pipe connecting pipe 6. The inter-pipe connecting pipe 6 connects the lower tank connection pipe 4 to the upper tank connection pipe 5. The connection is normally between the peak 4a of the first pipe 4, and the main body of the second pipe 5, this is substantially in the middle of the upper and lower pipes 5, 4. The inter-pipe connecting pipe is attached to the high point 4a of the first pipe 4 allows gas to escape via the inter-pipe connecting pipe 6 to enter the upper pipe 5 and thence the air gap 2a, 3a. The connecting pipe 6 is substantially vertical, although may be in other orientations in other embodiments.

In a variant of the present invention, the lower tank connecting pipe 4 and/or the upper tank connecting pipe 5 may extend into one or both of the positive electrolyte tanks 2 and the negative electrolyte tank 3.

The arrangement depicted in FIG. 1 is such that if either the positive electrolyte tank 2 or the negative electrolyte tank 3 were punctured, gas from the second pipe 5 could move into the first pipe 4 via the connecting pipe 6. The movement of gas in this manner prevents significant syphoning occurring. Such a scenario is depicted in FIG. 2.

Figure 2:
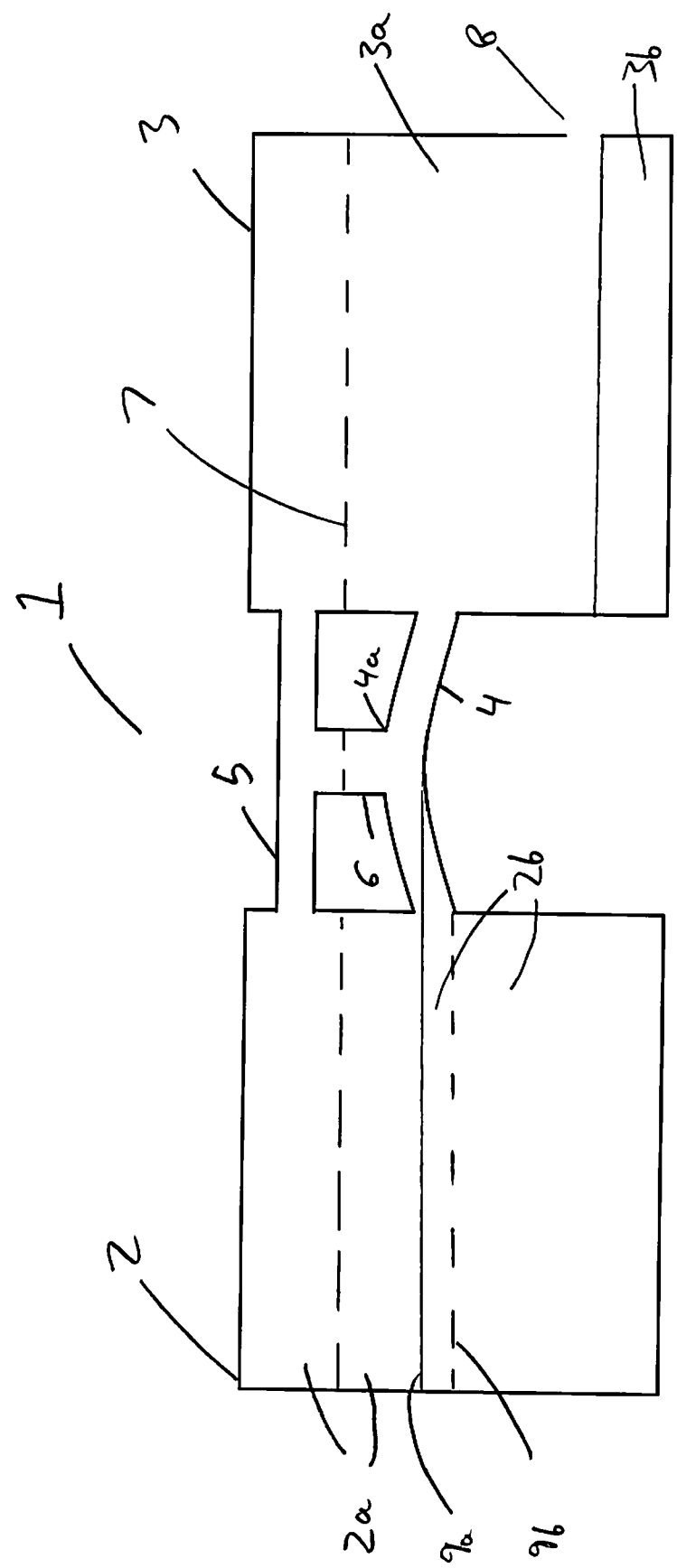

FIG. 2 differs from FIG. 1 in that the tank 3 has a puncture 8. There is a positive electrolyte tank 2 and a negative electrolyte tank 3. The electrolyte tanks 2, 3 are connected by both a first pipe 4 and a second pipe 5. The first pipe 4 has a peak 4a. A connecting pipe 6 joins the first pipe 4 and the second pipe 5.

A dotted line 7 denotes the normal fill level of the tank. As a result of the puncture 8 in electrolyte tank 3, electrolyte leaks from the tank. The level in tank 3 drops until the fill area 3b of tank 3 is below the puncture 8. The inter-pipe connecting pipe 6 allows gas from the air gaps 2a, 3a of both tanks to enter the lower tank connecting pipe 4 and fill the void. This stops a syphon from forming, thereby reducing the total volume spilled. The tank should empty only down to level 9a, this corresponds to the lower part of the lower tank connecting pipe 4 at its peak 4a. Without the inter-pipe connecting pipe 6, a syphon would be formed in the lower tank connecting pipe 4, and the electrolyte tank 2 would continue to drain down to the demarcation 9b.

In a variation of the present invention, the lower pipe and/or the upper pipe could extend into the electrolyte tanks. If either tank was punctured with the first pipe 4 extending into the body of the tank, the electrolyte level of the un-punctured tank would be lower as the siphon effect would last longer.

The lower tank connecting pipe 4 is generally curved, with a high point 4a. The greater the difference between the lower pipe openings in the tank, and the peak 4a, the less impact syphoning will have on the tank emptying.

The invention is not intended to be restricted to the details of the above described embodiments.

The invention claimed is:

1. Means for maintaining level complementary electrolytes in a pair of flow battery tanks, the means comprising:
a first tank, and
a second tank, wherein the first and second tanks are connected by:
a lower tank connection pipe configured to provide continuous fluid communication between the first and second tanks, and
an upper tank connection pipe, wherein:
the lower tank connection pipe and the upper tank connection pipe are connected by an inter-pipe connecting pipe,
wherein the lower tank connection pipe is curved such that it has a high point between the first and second tanks, and
wherein the inter-pipe connecting pipe connects to the lower tank connection pipe at the high point of the lower tank connection pipe.

2. The means for maintaining level complementary electrolytes in a pair of flow battery tanks, as claimed in claim 1, wherein one of the first or second tanks houses a positive electrolyte, and the other of the first or second tanks houses a negative electrolyte with a cell stack located therebetween.

3. The means for maintaining level complementary electrolytes in a pair of flow battery tanks, as claimed in claim 1, wherein the lower tank connection pipe is connected to both the first and second tanks below a desired liquid level of each of the first and second tanks.

4. The means for maintaining level complementary electrolytes in a pair of flow battery tanks, as claimed in claim 1, wherein the lower tank connection pipe is adapted to have a bore diameter of 10 mm to 80 mm in order to minimise the volume of electrolyte which is relatively stagnant as a result of being in the lower tank connecting pipe.

5. The means for maintaining level complementary electrolytes in a pair of flow battery tanks, as claimed in claim 1, wherein the lower tank connection pipe is adapted to be of sufficient volume so that it can accommodate substantially the entire volume of electrolyte moving between the first and second tanks in one charge or discharge half-cycle.

6. The means for maintaining level complementary electrolytes in a pair of flow battery tanks, as claimed in claim 1, wherein the lower tank connecting pipe has a constant or varied bore size.

7. The means for maintaining level complementary electrolytes in a pair of flow battery tanks, as claimed in claim 1, wherein the upper tank connection pipe is connected to both the first and second tanks above a desired liquid level.

8. The means for maintaining level complementary electrolytes in a pair of flow battery tanks, as claimed in claim 1, wherein the upper tank connecting pipe has a larger diameter than the lower tank connecting pipe.

9. The means for maintaining level complementary electrolytes in a pair of flow battery tanks, as claimed in claim 1, wherein the upper tank connecting pipe is adapted to act as an overflow pipe if the lower tank connecting pipe is blocked.

10. The means for maintaining level complementary electrolytes in a pair of flow battery tanks, as claimed in claim 1, wherein the lower pipe, upper pipe and inter-pipe connecting pipe are in substantially the same plane.

11. The means for maintaining level complementary electrolytes in a pair of flow battery tanks, as claimed in claim 1, wherein the upper tank connection pipe allows for movement of a gas blanket between the first and second tanks.

12. A vanadium redox flow battery having a pair of flow battery tanks and comprising a means for maintaining level complementary electrolytes in the pair of flow battery tanks as defined in claim 1.

13. A means for maintaining level complementary electrolytes in a pair of flow battery tanks, the means comprising:
a first tank, and
a second tank, wherein the first and second tanks are connected by:
a lower tank connection pipe configured to provide continuous fluid communication between the first and second tanks, and
an upper tank connection pipe, wherein:
the lower tank connection pipe and the upper tank connection pipe are connected by an inter-pipe connecting pipe,
wherein the lower tank connection pipe is substantially W shaped, the W shape having a saddle, wherein the saddle has a high point between the first and second tanks, and
wherein the inter-pipe connecting pipe connects to the lower tank connection pipe at the high point of the saddle of the lower tank connection pipe.

14. The means for maintaining level complementary electrolytes in a pair of flow battery tanks, as claimed in claim 13, wherein one of the first or second tanks houses a positive electrolyte, and the other of the first or second tanks houses a negative electrolyte with a cell stack located therebetween.

15. The means for maintaining level complementary electrolytes in a pair of flow battery tanks, as claimed in claim 13, wherein the lower tank connection pipe is connected to both the first and second tanks below a desired liquid level of each of the first and second tanks.

16. The means for maintaining level complementary electrolytes in a pair of flow battery tanks, as claimed in claim 13, wherein the lower tank connection pipe is adapted to have a bore diameter of 10 mm to 80 mm in order to minimise the volume of electrolyte which is relatively stagnant as a result of being in the lower tank connecting pipe.

17. The means for maintaining level complementary electrolytes in a pair of flow battery tanks, as claimed in claim 13, wherein the lower tank connection pipe is adapted to be of sufficient volume so that it can accommodate substantially the entire volume of electrolyte moving between the first and second tanks in one charge or discharge half-cycle.

18. The means for maintaining level complementary electrolytes in a pair of flow battery tanks, as claimed in claim 13, wherein the lower tank connecting pipe has a constant or varied bore size.

19. The means for maintaining level complementary electrolytes in a pair of flow battery tanks, as claimed in claim 13, wherein the upper tank connection pipe is connected to both the first and second tanks above a desired liquid level.

20. The means for maintaining level complementary electrolytes in a pair of flow battery tanks, as claimed in claim 13, wherein the upper tank connecting pipe has a larger diameter than the lower tank connecting pipe.

* * * * *